United States Patent
El Khoury et al.

(10) Patent No.: US 9,985,945 B2
(45) Date of Patent: May 29, 2018

(54) SPOOFING PROTECTION PROTOCOL FOR NETWORK-CONNECTED THINGS

(71) Applicant: SAP SE, Walldorf (DE)

(72) Inventors: Paul El Khoury, Heidelberg (DE); Oliver Kling, Bruchsal (DE)

(73) Assignee: SAP SE, Walldorf (DE)

( * ) Notice: Subject to any disclaimer, the term of this patent is extended or adjusted under 35 U.S.C. 154(b) by 274 days.

(21) Appl. No.: 14/920,234

(22) Filed: Oct. 22, 2015

(65) Prior Publication Data

US 2017/0118187 A1    Apr. 27, 2017

(51) Int. Cl.
*H04L 29/06* (2006.01)
*H04L 29/08* (2006.01)

(52) U.S. Cl.
CPC .......... *H04L 63/08* (2013.01); *H04L 63/1408* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 7,587,608 B2 | 9/2009 | Haller et al. | |
| 8,762,731 B2 | 6/2014 | Engler et al. | |
| 8,881,239 B1 | 11/2014 | Poole | |
| 2004/0003083 A1* | 1/2004 | Wookey | H04L 67/42 709/225 |
| 2004/0103282 A1* | 5/2004 | Meier | G06Q 20/3674 713/171 |
| 2005/0100166 A1* | 5/2005 | Smetters | H04L 63/0492 380/277 |
| 2005/0228996 A1* | 10/2005 | Mayer | H04L 63/126 713/170 |
| 2009/0288165 A1* | 11/2009 | Qiu | G06F 21/552 726/23 |
| 2010/0250955 A1* | 9/2010 | Trevithick | G06F 21/31 713/185 |

(Continued)

OTHER PUBLICATIONS

Cho, Sik-Whan; Jang, Won-Jun; Lee, Hyung-Woo. mVOIP Service Attack and Authentication Mechanism on a Smart Work Device. 2011 International Conference on Computer Science and Network Technology (ICCSNT). Pub. Date: 2011. http://ieeexplore.ieee.org/stamp/stamp.jsp?tp=&arnumber=6182001.*

(Continued)

*Primary Examiner* — Jeremiah Avery
(74) *Attorney, Agent, or Firm* — Brake Hughes Bellermann LLP

(57) ABSTRACT

A protocol controller may execute a spoofing protection protocol for verifying a message received over a network from a network-connected thing, in the presence of a spoofed message transmitted from a spoofed thing illicitly representing the network-connected thing. The protocol controller may include a message handler configured to implement the spoofing protection protocol, including receiving a message identified as originating from the network-connected thing, executing a verification of a transmission characteristic of the message against an expected transmission characteristic previously stored with respect to the network-connected thing within a transmission characteristic repository, and determining whether the message originated from the network-connected thing, based on the verification.

20 Claims, 7 Drawing Sheets

(56) References Cited

U.S. PATENT DOCUMENTS

| | | | |
|---|---|---|---|
| 2011/0055585 A1* | 3/2011 | Lee | H04L 9/0844 |
| | | | 713/183 |
| 2013/0073473 A1* | 3/2013 | Heath | G06Q 30/02 |
| | | | 705/319 |
| 2013/0279695 A1 | 10/2013 | Rubin et al. | |
| 2013/0288721 A1* | 10/2013 | Marlow | H04W 4/14 |
| | | | 455/466 |
| 2013/0329889 A1 | 12/2013 | Griffith et al. | |
| 2015/0065166 A1 | 3/2015 | Ward et al. | |
| 2015/0109104 A1* | 4/2015 | Fadell | G08B 27/003 |
| | | | 340/5.65 |
| 2015/0128205 A1* | 5/2015 | Mahaffey | H04L 63/20 |
| | | | 726/1 |

OTHER PUBLICATIONS

Puangpronpitag, Somnuk; Suwannasa, Atthapol. A Design of Egress NAC using an Authentication Visa Checking mechanism to Protect against Mac Address Spoofing Attacks. ECTI-CON 2011. Pub. Date: 2011. http://ieeexplore.ieee.org/stamp/stamp.jsp?tp=&arnumber=5947832.*

De Lutiis, Paolo. Managing Home Networks Security Challenges: Security issues and countermeasures. 2010 14th International Conference on Intellligence in Next Generation Networks (ICIN). Pub. Date: 2010. http://ieeexplore.ieee.org/stamp/stamp.jsp?tp=&arnumber=5640935.*

\* cited by examiner

SPOOFING PROTECTION PROTOCOL FOR NETWORK-CONNECTED THINGS

TECHNICAL FIELD

This description relates to spoofing protection for the Internet of Things.

BACKGROUND

The "Internet of Things," or IoT, refers generally to the concept of equipping items with a capability that may or may not normally be associated with such items (e.g., a sensing or actuating capability), and connecting the items to the Internet or other network, so as to leverage the capability for an intended purpose. For example, in household settings, it is possible to equip household items such as appliances, lights, or locks with sensors in order to monitor associated functionalities thereof, and with actuators in order to implement changes in the monitored functionalities (e.g., turn off a light, or lock a door).

Within these and related contexts, there are many types of items that can be equipped in the manner just referenced, using a variety of different techniques. Indeed, it is a feature of the concept to be widely applicable in disparate settings, including settings not typically associated with network connectivity. Consequently, items thus-equipped are often referred to in the most general sense as "things," resulting in the above-referenced nomenclature of "Internet of Things" (although virtually any network could be used).

As with virtually any network-related system, security is a concern in the IoT. Moreover, the nature of specific implementations of the IoT may raise particular or additional security concerns.

SUMMARY

Described techniques provide for providing spoofing protection for messages received from network-connected things, including pre-designating expected or known transmission characteristics to be associated with the messages and/or the network-connected thing(s) from which the messages are received. For example, the transmission characteristics may include pre-designated or expected time windows in which the messages are expected to be received, or known location(s) of the network-connected thing(s) at the times the messages are sent. Additional or alternative techniques, such as relying on backchannel communications if available, may also be used to provide spoofing protection. With these and related techniques, spoofing protection may be applied in an efficient and inexpensive manner, including scenarios in which the network-connected things are not provided with (e.g., constructed with) reliable authentication capabilities.

According to one general aspect, a system may include instructions recorded on a non-transitory computer-readable storage medium, and executable by at least one processor. The system may include a protocol controller configured to cause the at least one processor to execute a spoofing protection protocol for verifying a message received over a network from a network-connected thing, in the presence of a spoofed message transmitted from a spoofed thing illicitly representing the network-connected thing. The protocol controller may include a message handler configured to implement the spoofing protection protocol, including receiving a message identified as originating from the network-connected thing, executing a verification of a transmission characteristic of the message against an expected transmission characteristic previously stored with respect to the network-connected thing within a transmission characteristic repository, and determining whether the message originated from the network-connected thing, based on the verification.

According to another general aspect, a computer-implemented method for executing instructions stored on a non-transitory computer readable storage medium may include establishing, with a network-connected thing, an expected plurality of time windows in which messages from the network-connected thing are expected to be received, and establishing, with the network-connected thing, an expected location parameter of the network-connected thing. The method also may include receiving a message identified as originating from the network-connected thing and identified as potentially being a spoofed message transmitted from a spoofed thing illicitly representing the network-connected thing, selecting one or both of the expected plurality of time windows and the expected location parameter, and executing a verification of the message as originating from the network-connected thing, based on the selecting.

According to another general aspect, a computer program product may be tangibly embodied on a non-transitory computer-readable storage medium and may include instructions that, when executed, are configured to cause at least one computing device to store a spoofing protection protocol specifying at least one transmission characteristic of at least one message to be sent by a network-connected thing, and receive, in accordance with the spoofing protection protocol, a message identified as originating from the network-connected thing and identified as potentially being a spoofed message transmitted from a spoofed thing illicitly representing the network-connected thing. The instructions, when executed, may be further configured to select, based on the message and in accordance with the spoofing protection protocol, the at least one transmission characteristic as including one or both of an expected plurality of time windows in which messages from the network-connected thing are expected to be received and an expected location parameter of the network-connected thing, verify whether the at least one transmission characteristic complies with the spoofing protection protocol, and send, in a case where the transmission characteristic does not comply with the spoofing protection protocol, a backchannel message to the network-connected thing to verify an identify thereof.

The details of one or more implementations are set forth in the accompanying drawings and the description below. Other features will be apparent from the description and drawings, and from the claims.

DETAILED DESCRIPTION

Figure 1:
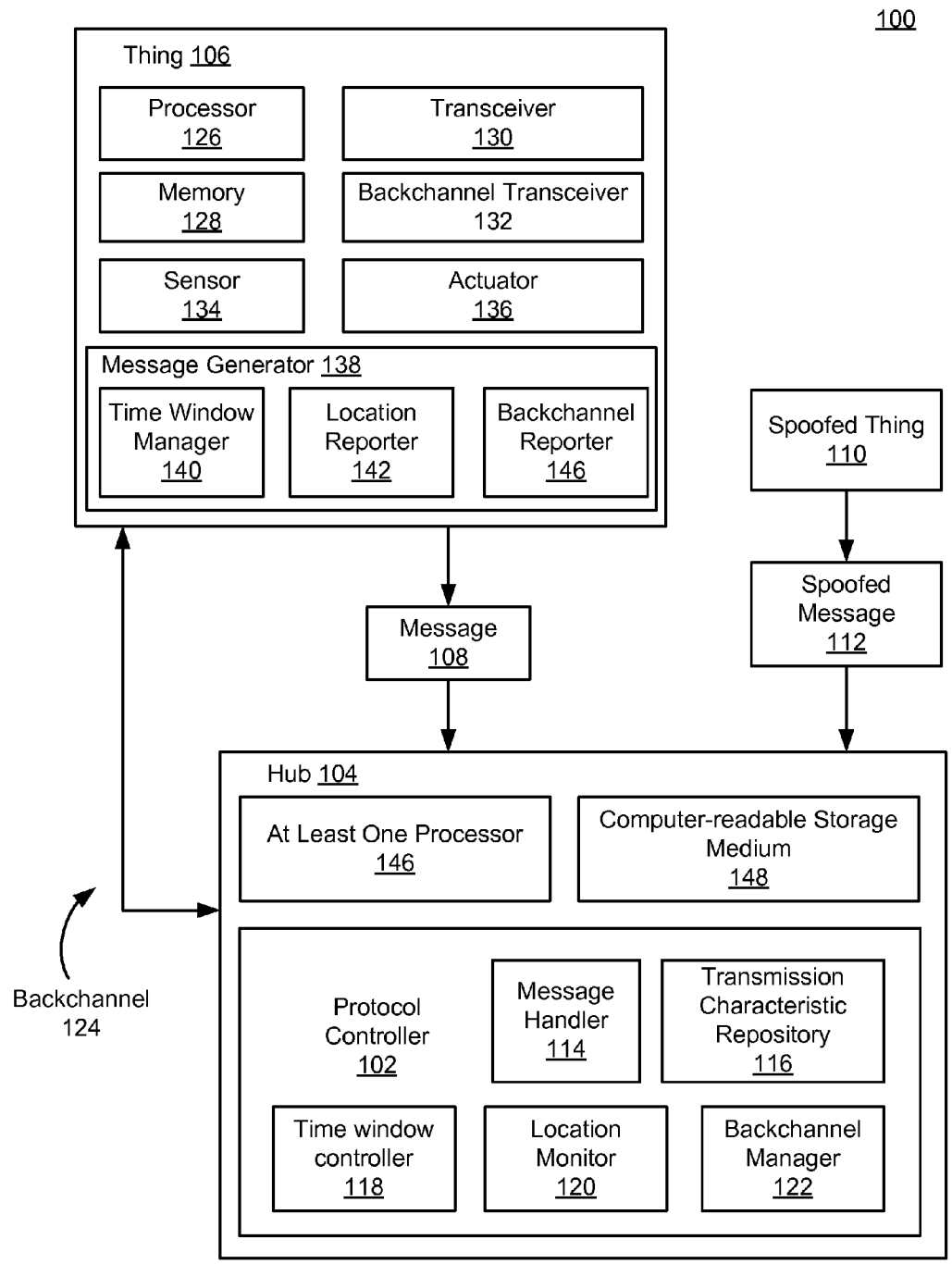
FIG. 1 is a block diagram of a system for implementing a spoofing protection protocol for network-connected things.

FIG. 1 is a block diagram of a system 100 for implementing a spoofing protection protocol for network-connected things. As shown in FIG. 1 and described in detail, below, a protocol controller 102 at a hub 104 is configured to communicate with a network-connected thing 106 (also referred to herein simply as a 'thing') to receive one or more messages 108. In the examples, it is assumed that a malicious or otherwise illicit spoofed thing 110 may attempt to send a spoofed message 112 to the hub 104, in an attempt to impersonate the actual network-connected thing 106 and cause some sort of harm or damage to the operations of the hub 104.

In FIG. 1, a message handler 114 of the protocol controller 102 is configured to receive the message 108 and the spoofed message 112, and to compare transmission characteristics thereof against expected transmission characteristics that have been pre-designated with respect to the network-connected thing 106, and stored within a transmission characteristic repository 116. Accordingly, and even if the spoofed thing 110 has otherwise successfully impersonated the network-connected thing 106 (e.g., has used a stolen ID and/or authentication credentials), the message handler 114 may determine that the message 108 is authentic and/or that the spoofed message is, or at least may be, illicit. As a result, operations of the system 100 may be protected, and therefore implemented in a reliable, safe manner.

In more detail, as shown, the protocol controller 102 may include a time window controller 118, which may be configured to impose expectations regarding pre-defined timeslots in which the message 108 is expected to be received from the network-connected thing 106. For example, the time window controller 118 may be used to designate that messages from the network-connected thing 106 are expected every ten minutes (with a margin of +/− five seconds or other appropriate value). Then, this expectation may be stored within the transmission characteristic repository 116. Later, when the message 108 and the spoofed message 112 are received, the message handler 114 may compare times of receipt thereof against the expected times of receipt from the transmission characteristic repository 116.

Somewhat similarly, the protocol controller 102 may include a location monitor 120. As described in more detail below, location in this sense may refer to either or both of a physical location or a network location, including route(s) between such locations. As referenced above, the location monitor 120 may be used to store a known or expected location parameter or characteristic for the network-connected thing 106 within the transmission characteristic repository 116. Then, upon receipt of the message 108 or the spoofed message 112, the message handler 114 may compare a location parameter at a time of receipt thereof against the expected location parameter(s) at the times of receipt, using the transmission characteristic repository 116.

In another example operation of the protocol controller 102, a backchannel manager 122 may be used to provide spoofing protection, using a backchannel 124. In other words, as explained in more detail below, it may occur that the message 108 and the spoofed message 112 may be received by way of a primary communications channel. In some cases, the network-connected thing 106 may include a capability for a secondary communication channel (i.e., the backchannel 124). In such cases, the protocol controller 102 may utilize the available backchannel to supplement or replace the transmission characteristic comparisons referenced above. For example, in cases where one or both of the time window and location comparisons are indeterminate or indicate possible spoofing, the backchannel 124 may be used to verify an authenticity of the network-connected thing 106 and the message 108.

In practice, the network-connected thing 106 may represent virtually any of the types of items referenced above as potentially being included in the Internet of Things, or IoT, where, as also referenced, such items may have a wide range of hardware and software capabilities. In the simplified example of FIG. 1, the network-connected thing 106 is illustrated as including a processor 126 and a memory 128, as well as a transceiver 130 and a backchannel transceiver 132. Also illustrated is a sensor 134 and an actuator 136. The network-connected thing 106 is also illustrated as including a message generator 138, which includes a time window manager 140, a location reporter 142, and a backchannel reporter 144, designed to implement complementary aspects of the time window controller 118, the location monitor 120, and the backchannel manager 122, respectively.

Thus, the processor 126 may represent processors ranging from relatively slow, weak, inexpensive processors, to more modern or expensive processors. Similarly, a speed and quantity of the memory 128 may vary widely in different example implementations. Meanwhile, the sensor 134 may represent virtually any ability to monitor or detect internal or external characteristics at the network-connected thing 106, and the actuator 136 may represent virtually any ability to implement changes to internal or external characteristics at the network-connected thing 106.

Aspects of the components 126-136 of the network-connected thing 106 are generally conventional, except as otherwise described, and would be apparent to one of skill in the art, and are therefore not described in further detail herein, except as may be necessary or helpful in understanding example operations of the system 100 of FIG. 1. Nonetheless, for the sake of illustration and example, it may be observed that the components 126-136 may be integrated within a singular item, or may be attached to an item (e.g., to retrofit the item with IoT capabilities). Further, in various example implementations, one or more of the components 126-136 may be omitted, such as when the network-connected thing 106 provides a purely passive monitoring function and the actuator 136 is not included, or such as when the backchannel transceiver 132 is not available.

At a system level, examples of implementations of the IoT may be characterized as including sensor networks, automation systems, control systems, and other embedded systems. General physical contexts for IoT applications include a home, a store or factory, a city, a physical area (such as a highway, or an area of the sea), or the human body. Consequently, non-limiting examples of specific applications include home automation, home security, inventory control, manufacturing control, control of traffic signals, or monitoring and reporting of a patient's heart activity.

In order to implement these and many other examples of IoT applications, many different hardware, software, and communications platforms have been used. For example, IoT implementations may include Radio Frequency Identification (RFID), near field communications (NFC), bar codes, quick response (QR) codes, wired communications, and/or various wireless networking and communications techniques and associated protocols for implementing a local or personal area network (e.g., WiFi, Bluetooth, or Zigbee).

Accordingly, in various implementations, the hub 104 may be provided with any necessary hardware and software, including at least one processor 146 and non-transitory computer readable storage medium 148. That is, the at least one processor 146 may represent one or more processors executing instructions stored using the non-transitory computer-readable storage medium 148 to execute the protocol controller 102 and any other functions of the hub 104. Although not explicitly illustrated in the simplified example of FIG. 1, the hub 104 may include other hardware required for communicating with the network-connected thing 106, including one or more transceivers and backchannel transceivers.

In fact, the hub 104 may be understood to represent a relatively more powerful computing device (as compared to the network-connected thing 106), such as a personal computer. Accordingly, the hub 104 may be provided with associated functionalities for implementing the protocol controller 102, such as a monitor or other display for providing a graphical user interface (GUI) for use by a user in configuring aspects of the protocol controller 102 (e.g., defining a time window or other transmission characteristic to be used, or defining actions to take in the event of possible spoofing detection).

Figure 2:
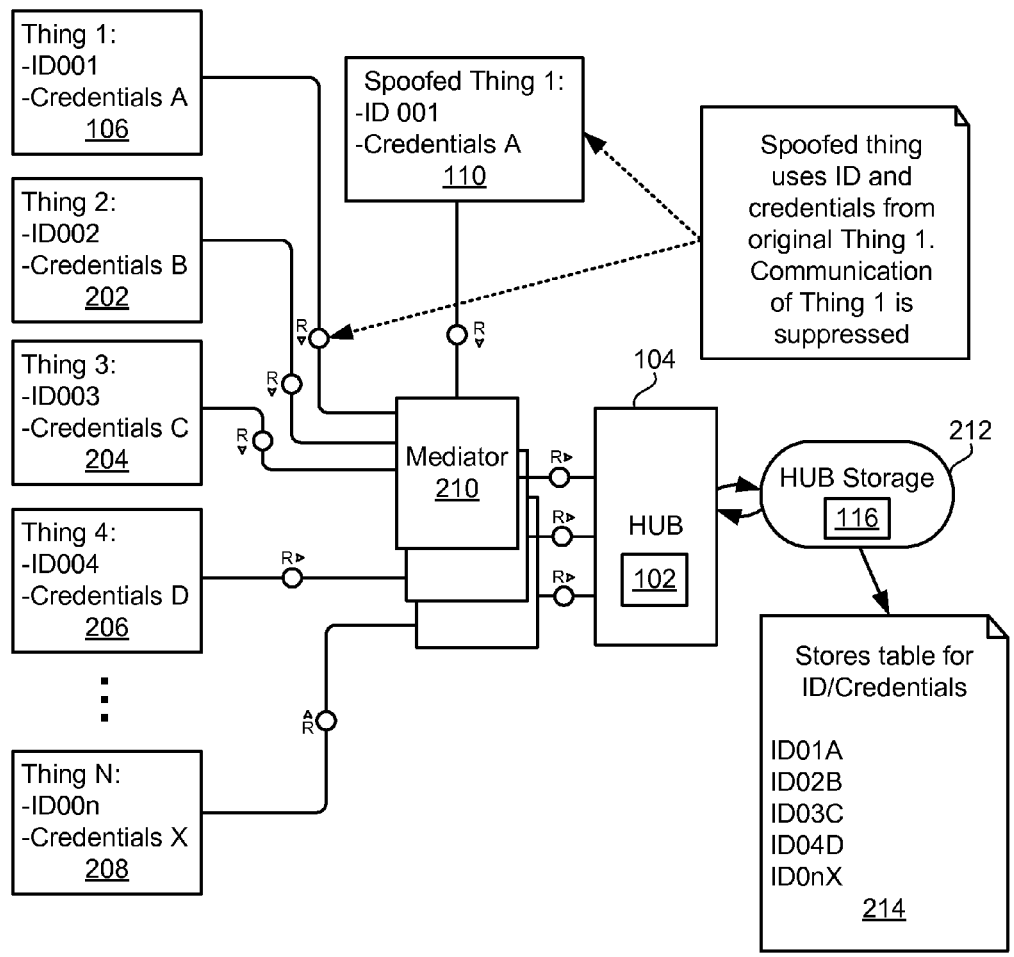
FIG. 2 is a block diagram of an example implementation of the system of FIG. 1.

Moreover, the hub 104 may have the capability to communicate with, and oversee, a potentially large number of network-connected things, including the network-connected thing 106. For example, FIG. 2 illustrates an example implementation of a system 200 in which the hub 104 oversees operations of the network-connected thing 106, as well as a number of other network-connected things 202, 204, 206, and 208. In order to oversee a larger number of things, particularly when the things are dispersed, one or more intervening mediator(s) 210 may be used to collect messages from (and communicate messages to) corresponding, assigned things, and to aggregate messages for reporting to the hub 104.

In the example of FIG. 2, the various things 106 and 202-208 are each illustrated as being associated with an identifier (ID) and credentials (A, B, C, D, and X, respectively). For example, the ID may represent a standard machine ID (SMID), such as a standard MAC-ID. In the system 200 of FIG. 2, as illustrated, it is possible for the hub 104 to utilize hub storage 212 to store and match credentials 214 as one technique for attempting to authenticate messages from the various things 106, 202-208. For example, a message from the network-connected thing 106 may include ID001 and credentials A, and these may be matched to the ID/credentials 214 in order to verify the identity of the thing 106.

However, if the spoofed thing 110 has access to the ID and/or credentials, the spoofed thing 110 can send a spoofed message (e.g., the spoofed message 112 of FIG. 1), and impersonate the network-connected thing 106. For example, if the ID is the standard MAC-ID, a malicious user who has physical access to the network-connected thing 106 may obtain the ID (e.g., from a network card or packaging material having the imprinted MAC-ID). Such access may occur, for example, in business settings in which the business owner/operator relies on physical security measures to prevent undesired access to machines (e.g., the machines are behind fences, within buildings, or otherwise physically blocked from the public). Nonetheless, persons who circumvent such physical security measures, including malicious employees, may obtain desired information (such as a MAC-ID). Additionally, or alternatively, in cases where the ID is in a standard format, the malicious user may guess the ID by trial-and-error.

Using known password-hacking techniques (or by otherwise stealing or obtaining the credentials), the malicious operator may obtain the associated credentials and proceed to impersonate the network-connected thing by sending spoofed messages. Moreover, in some situations, the malicious operator of the spoofed thing 110 may have a capability to suppress communications from the network-connected thing 106, so that the only messages with ID001 and credentials A will be illicit, spoofed messages coming from the spoofed thing 110.

Thus, relying on standard IDs (e.g., machine IDs) and/or credentials often may be insufficient in avoiding spoofed messages. Consequently, some network-connected things have been constructed using cryptographically strong hardware or other known techniques that, e.g., bind a physical address of a network-connected thing with a logical network/system ID (and associated secure credentials).

However, such techniques are not always practical, available, or sufficient. For example, in many cases network-connected things may already be deployed and operable, and, by their nature, may be large in number, difficult to access, and/or dispersed geographically. It may be difficult, impractical, or impossible to retrofit or replace network-connected things in these and similar circumstances. More generally, the use of the types of relatively advanced and/or hardware-based cryptographic techniques may simply be too expensive or problematic to implement on a desired scale, or in a desired setting.

As a result, the types of spoofing attacks referenced above can become extremely problematic for operators of networks of things such as those described herein. For example, the malicious operator of the spoofed thing 110, if not detected and/or stopped, may proceed to inject false messages into the hub 104. As a result, data quality may be decreased, and/or fraud may be perpetuated.

For example, in terms of decreasing data quality, it may occur that the hub 104 is collecting messages from a number of sensors (e.g., weather measurements, or measurements of operating machinery being monitored). In such cases, it will be expected that even normal operations will have some small percentage of outlier values, due to normal malfunctions of sensors or other causes. These outlier values can normally be estimated statistically, and discarded. However, if the spoofed thing 110 is injecting a large number of intentionally wrong values using spoofed messages, the hub 104 will become unable to determine which values are valid and which are false, thereby rendering the entire data set unusable.

In terms of fraud, the malicious operator of the spoofed thing 110 may use spoofed messages to cause a number of different types of difficulties for the operator of the system(s) 100/200. For example, spoofed messages may be sent that raises an alarm when no actual problem has occurred, resulting in costly alarm management procedures and reductions in desired operations (e.g., reductions in production in a manufacturing facility). In other examples, spoofed messages can be sent that provide intentionally deceptive values, such as reporting an incorrect route taken in the context of fleet management, or incorrectly reporting compliance with certain thresholds (e.g., again in fleet management, such thresholds may include maximum speed limits, or maximum engine rotations).

Therefore, as referenced above, the example system 100 of FIG. 1 includes the protocol controller 102, as well as the message generator 138. As described in detail herein, the protocol controller 102 enables easy, inexpensive, reliable, scalable, and customizable protection against spoofing attacks, without requiring specialized or advanced hardware and associated cryptographic techniques, and in many cases leveraging native/existing functionalities and capabilities of the network-connected thing 106.

For example, as referenced above, the time window controller 118 of the protocol controller 102 may be configured to receive messages from the network-connected thing 106 within defined, expected time windows (subject to a tolerance window). Accordingly, messages arriving within the defined time window may be kept and either used or examined further, while messages arriving outside of the time window may be discarded, or may be collected and analyzed to obtain information regarding possible spoofing attacks.

The time window may be implemented using the message generator 138 of the network-connected thing 106. For example, native functions of the message generator 138 may be used to configure sending of messages (such as the message 108) within a defined time window. In other examples, a more specialized time window manager 140 may be included within the network-connected thing 106 in order to provide advantageous features.

For example, depending on native functionalities of the message generator 138, it may be possible to periodically (or irregularly) change parameters of the defined time window. For example, it may be possible to alter, e.g., a length of the time window, a magnitude of the tolerance window, a time between adjacent time windows, or a frequency or manner of changing any of the preceding parameters. In such examples, it may be more difficult for the spoofed thing 110 to send spoofed messages consistently within the various time windows.

Further, it may be possible to make determinations or inferences regarding a validity or invalidity of messages, or a presence of a spoofing attack, based on defining and altering such parameters. For example, if the spoofed thing 110 successfully sends the spoofed message 112 within a proper time window in conjunction with the message 108, it may be difficult to determine whether either or both of these are authentic, and both messages may be discarded or analyzed with suspicion. However, if the time window is altered and messages originating from a same apparent source continue to be received consistently, while messages from another apparent source are not, it may be possible to infer a greater likelihood of authenticity for the first message source and/or group(s) of messages. Further details regarding the time window controller 118 are provided below, e.g., with respect to FIGS. 4 and 7.

Further, the location monitor 120 may be configured to expect messages, such as the message 108, to be received from a specific location, such as a physical location and/or a network location. With respect to physical location, it may occur that the network-connected thing 106 is physically connected to a moving object, such as an automobile, and is thus moving itself and capable of providing its physical (geographical) location over time by way of the location reporter 142, e.g., by including GPS (global positioning system) coordinates within the message 108. Of course, if the network-connected thing 106 is not moving and not expected to move, then the location reporter 142 can provide the physical location of the network-connected thing 106, as well.

In further examples of the latter scenario, when the network-connected thing 106 is stationary, the protocol controller 102 may be configured to verify a network route over which the message 108 arrives, permitting only messages arriving over the pre-defined route to be accepted. For example, the network route may include an Internet Protocol (IP) route, or a virtual private network (VPN) with dedicated endpoints.

In general, as with the time window manager 140, native functions of the message generator 138 may be used to configure sending of messages (such as the message 108) with reported location details, using the location reporter 142. Additionally, or alternatively, a more specialized location reporter 142 may be included within the network-connected thing 106 in order to provide advantageous features.

For example, depending on native functionalities of the message generator 138, it may be possible to periodically (or irregularly) change parameters of the defined location reporting. For example, it may be possible to alter, e.g., a type of location reporting being performed, or a frequency of changing such parameters. In such examples, it may be more difficult for the spoofed thing 110 to send spoofed messages consistently in accordance with expected/defined location reporting.

Further, as referenced above, it may be possible to make determinations or inferences regarding a validity or invalidity of messages, or a presence of a spoofing attack, based on defining and altering such location-related parameters. For example, if the spoofed thing 110 successfully sends the spoofed message 112 with expected/correct location reporting, in conjunction with the message 108, it may be difficult to determine whether either or both of these are authentic, and both messages may be discarded or analyzed with suspicion. However, if the location reporting requirements are altered over time and messages originating from a same apparent source continue to be received consistently, while messages from another apparent source are not, it may be possible to infer a greater likelihood of authenticity for the first message source and/or group(s) of messages. Further details regarding the location monitor 120 are provided below, e.g., with respect to FIGS. 5 and 7.

As also referenced above, the backchannel manager 122 may be configured to verify messages, such as the message 108, through the use of a backchannel(s), such as the backchannel 124. For example, the backchannel manager 122 may request a confirmation or verification from the network-connected thing 106, by way of the backchannel transceiver 132, in order to test a validity of the message 108 and/or the spoofed message 112.

For example, backchannel verification may occur randomly, or in pre-set time intervals. Backchannel verification may occur in response to a pre-defined situation that has been determined to be potentially associated with spoofing, such as a receipt of the same message twice, receipt of two different messages when only a single message is expected, or the same or different messages arriving from different locations.

In general, as with the time window manager 140 and the location reporter 142, native functions of the message generator 138 may be used to configure use of the backchannel transceiver 132 to achieve the types of backchannel verifications described herein. For example, in perhaps the simplest case, the backchannel manager 122 may simply request additional verification of the message 108 or the spoofed message 112, using the same communications medium/channel and network address used to send the message 108 and the spoofed message 112 originally (where this approach may not work if the spoofed thing 110 is capable of receiving messages using an address of the network-connected thing 106, since the spoofed thing 110 could then simply provide an illicit verification of the spoofed message 112). Additionally, or alternatively, a more specialized backchannel reporter 144 may be included within the network-connected thing 106 in order to provide advantageous features, and depending on characteristics and capabilities of the backchannel transceiver 132.

For example, depending on native functionalities of the message generator 138, it may be possible to use a actual second communications channel/medium, such as using the Simple Message Service (SMS) as a second channel to, e.g., hypertext transfer protocol (http) traffic. Further, any such verification/confirmation requirements may themselves require additional authentication, such as requiring additional secrets, challenges, or other authentication techniques.

In still further examples, the backchannel 124 may be used to change configuration parameters of the message generator 138 such as those referenced above, including parameterizations of the time window manager 140, the location reporter 142, or the backchannel reporter 144. For example, the backchannel 124 may be used to change a timing or duration of the time window being used, the location reporting requirements, or the circumstances or manner in which backchannel verifications are required. As described, by utilizing monitoring and control of various transmission characteristics of the message 108, including altering related configuration parameters over time, additional spoofing protection may be provided. Further details regarding the location monitor 120 are provided below, e.g., with respect to FIGS. 5 and 7.

Of course, as also described in more detail below, the spoofing protection protocol(s) provided and implemented by the protocol controller 102 may be implemented using various combinations of the techniques described above, where such combinations may be implemented differently over time as another way(s) of making it difficult for the spoofed thing 110 to send the spoofed message 112 successfully, as also referenced below with respect to FIG. 7.

In order to obtain these and related advantageous features, as referenced above, the protocol controller 102 may be configured with configuration capabilities, including an associated graphical user interface (GUI, not shown). Then, a user of the protocol controller 102 may use the configuration GUI to require different combinations and parameterizations of the protocol controller 102 and/or the message generator 138. During execution, the message handler 114 may be configured to implement configured techniques for executing receipts of messages, including evaluating compliance with parameters of the protocol controller 102, and implementing techniques for responding to any potential lack of compliance with the parameters.

Figure 3:
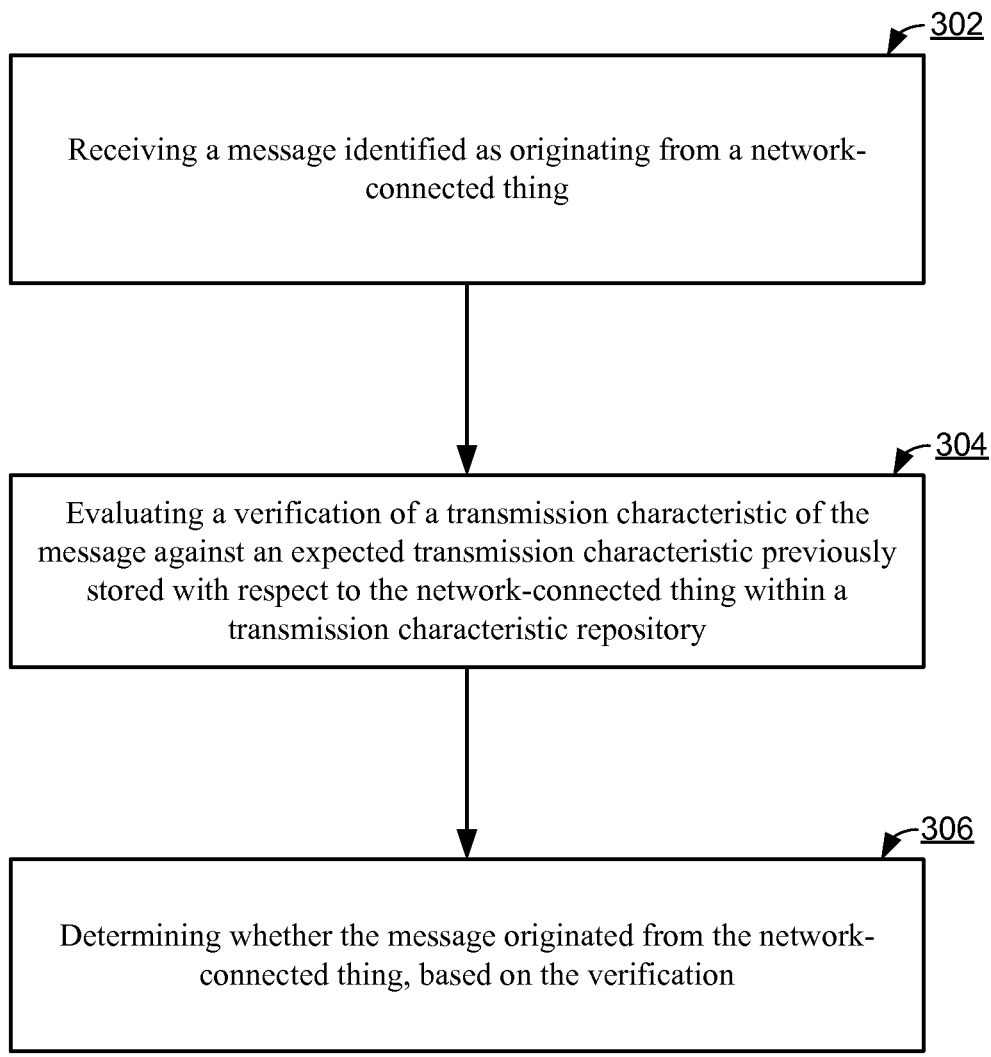
FIG. 3 is a flowchart illustrating example operations of the system of FIG. 1.

FIG. 3 is a flowchart illustrating example operations of the systems 100, 200 of FIGS. 1 and 2. In the example of FIG. 3, operations 302-306 are illustrated as separate, sequential operations. However, it will be appreciated that the flowchart 300 may include additional or alternative operations, and/or may have one or more illustrated operations omitted in whole or in part, and/or may include one or more sub-operations for each such operation. In all such implementations, various operations and sub-operations may be performed in a partially or completely overlapping or parallel manner, or a nested, iterative, looped, or branched fashion.

In FIG. 3, as part of a computer-implemented method for executing a spoofing protection protocol for verifying a message received over a network from a network-connected thing, in the presence of a spoofed message transmitted from a spoofed thing illicitly representing the network-connected thing, a message identified as originating from the network-connected thing may be received (302). For example, the message handler 114 may receive the message 108 and/or the spoofed message 112. The message(s) may have (either authorized or illicit) inclusion of an identifier identifying the network-connected thing 106 (e.g., a machine address or other identifying characteristic).

A verification of a transmission characteristic of the message may be evaluated against an expected transmission characteristic previously stored with respect to the network-connected thing within a transmission characteristic repository (304). For example, the message handler 114 may be configured to determine an expected time window, location, and/or backchannel verification that is associated within the transmission characteristic repository 116 with the network-connected thing 106. Thus, for a plurality of network-connected things, the transmission characteristic repository 116 may include different configurations and/or parameterizations for individual ones of the network-connected things (e.g., corresponding location requirements and/or arbitrarily-assigned time windows for each network-connected thing), where such configurations and/or parameterizations may change over time, either in response to changing conditions within the system (e.g., a moving object becoming stationary, or vice-versa), or simply to increase a chance of confusing or effectively blocking activities of the spoofed thing 110.

Whether the message originated from the network-connected thing may be determined, based on the verification (306). For example, the message handler 114 may be configured to verify that the time window of receipt, or the location of the network-connected thing 106, corresponds to the configured time window of transmission for the message 108. As referenced, it is possible to use two or more verification techniques in combination with one another, in order to enhance an overall security and reliability of the described techniques.

Figure 4:
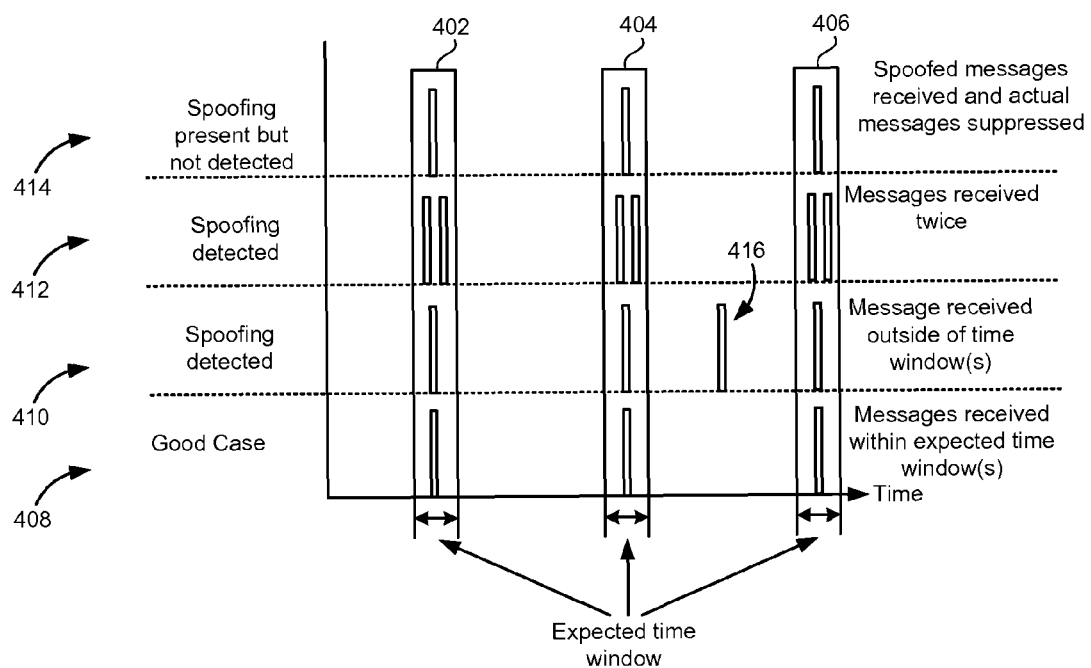
FIG. 4 is a timing diagram illustrating operations of the time window controller of FIG. 1.

FIG. 4 is a timing diagram illustrating operations of the time window controller 118 of FIG. 1. In the example of FIG. 4, three time windows 402, 404, and 406 are illustrated, representing the types of expected time windows for receiving messages from the network-connected thing 106, such as the message 108 of FIG. 1. With respect to each of the time windows 402-406, four example scenarios 408, 410, 412, and 414 are illustrated.

In the first scenario 408, as shown, each of the time windows 402, 404, 406 receive an expected message. That is, no potential issues or difficulties are identified, as the expected messages, and only the expected messages, are received from the identified network-connected thing 106, and within each expected time window.

In a second scenario 410, again, each of the time windows 402, 404, 406 contain the expected message anticipated as being received from the network-connected thing 106. In addition, however, another message 416 is received outside of any of the time windows 402-406, i.e., is received in a time period between the end of the time period 404 and the beginning of the time period 406. For example, the received message 416 may represent the spoofed message 112 of FIG. 1. In this case, as described above, the message handler 114 may determine that the message 416 is potentially a spoofed or non-authorized message, and may either discard the message 416, or store the message 416 separately for later analysis. Moreover, as also referenced above, the message handler 114 may count a number and frequency of messages received outside of the time windows 402, 404, 406, such as the message 416. Then, if a number or frequency of such potentially illicit messages reaches a predefined threshold, the message handler 114 may raise an alarm or initiate further analysis or corrective action.

In the scenario 412, as shown, each of the time windows 402, 402, 406 is illustrated as receiving two separate messages, even though, in the example, only a single message from the network-connected thing 106 is expected for each time window. For example, as described above, the spoofed thing 110 may be in the process of transmitting the spoofed message 112, and other spoofed messages, within the expected time windows 402-406.

Consequently, each message of the pair of messages in each of the time windows 402-406 may correspond conceptually to the message 108 and the spoofed message 112, respectively, of FIG. 1. Such a result may occur, for example, when the spoofed thing 110 has somehow gained illicit access to the parameters defining the time windows 402-406, or when the spoofed thing 110 sends spoofed messages within the time windows 402-406 by virtue of luck or coincidence.

Nonetheless, the message handler 114 has access to information from the transmission characteristic repository 116 regarding a number of messages per time window expected from the network-connected thing 106. Therefore, the message handler 114 may again take corrective action, such as discarding all of the messages received in the scenario 412, and/or raising an alarm.

In the fourth and final scenario 414, it may occur that the spoofed thing 110 is successful not only in sending illustrated messages (representing conceptually the spoofed message 112) within the expected time windows 402-406, but is also successful in suppressing communications from the network-connected thing 106, such as the message 108. In such scenarios, without additional measures being taken, as described herein, the message handler 114 may find it difficult or impossible to detect a possibility of spoofing in the fourth example scenario 414.

Although FIG. 4 provides a number of example scenarios and implementations, it will be appreciated that such implementations are non-limiting, and other techniques may be used. For example, it may occur that messages that are initially identified as being illicit spoofed messages, such as the message 416, or the pairs of messages within the scenario 412, may be saved, pending an outcome of determination as to whether some or all of the saved messages are illicit spoofed messages. Then, in scenarios in which some or all of the saved messages are determined to be authentic, such authentic messages may be processed at that time. Also, by changing parameters of the time windows, it may be possible to detect the possibility of spoofing even in the scenario 414 (e.g., if the subsequent spoofed messages are not adjusted to match the changed time window parameters).

Figure 5:
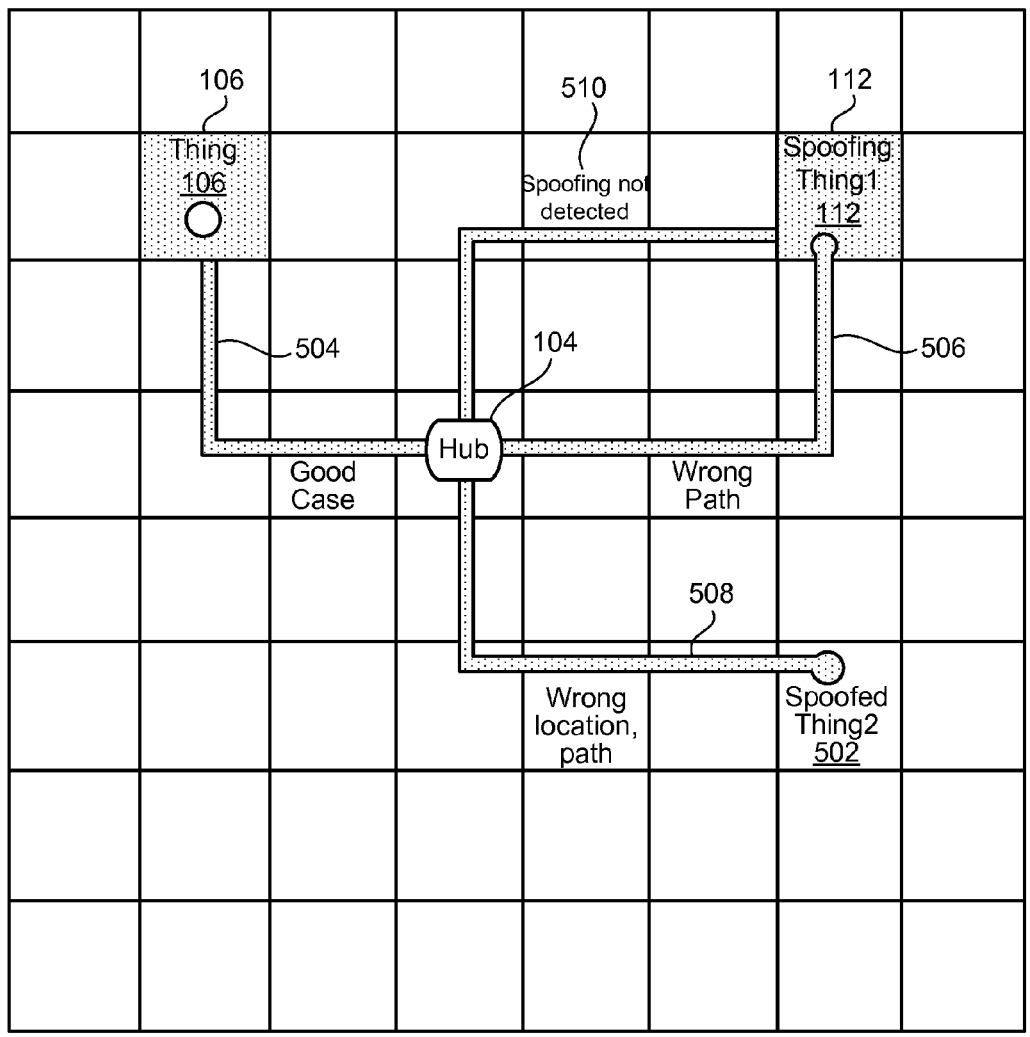
FIG. 5 is a route diagram illustrating operations of the location monitor of FIG. 1.

FIG. 5 is a route diagram illustrating operations of the location monitor 120 of FIG. 1. In the example of FIG. 5, as referenced above with respect to the location monitor 120 of FIG. 1, authentic messages, such as the message 108, are expected from the network-connected things at corresponding, specific locations or routes. That is, for example, as referenced above, the network-connected thing 106 may be located at a stationary position, and not expected to move, or may be in the process of moving between locations, and capable of sending its geographical location and route.

Additionally, as also referenced above, it may be possible for the location monitor 120 to verify a network route over which messages arrive, to thereby allow only messages received over a predefined network route, such as an IP route, or a VPN with dedicated end points.

In scenarios in which the network-connected thing 106 moves, and is able to provide its geographical location, such as, for example, an automobile, airplane, or farming or industrial machine, then the message handler 114, in conjunction with the location monitor 120, may verify the actual, received geographical location, as compared with an expected geographical location or route stored with respect to the network-connected thing within the transmission characteristic repository 116. For example, such verification may be made with respect to a predefined route, a maximum distance to or from a predefined location (e.g., a geographical circle defining a maximum movement area for the network-connected thing 106, and/or a match to a last known position (or proximity to the last known position). As with the time window examples of FIG. 4, if the actual location or route does not match the expected location or route, a number of actions may be taken, such as raising an alarm, storing suspicious messages for future analysis, or storing suspicious messages for subsequent processing in the event that the suspicious messages are later verified as being authentic.

In the example of FIG. 5, the network-connected thing 106 is illustrated as communicating with the hub 104, while the spoofed thing 112 is attempting to send illicit, spoofed messages, and, similarly, a second spoofed thing 502 is illustrated as also attempting to send illicit, spoofed messages.

In the example of FIG. 5, if the hub 104 receives a message from the network-connected thing 106 by way of an expected route 504, then the hub 104 may determine that successful verification has occurred, and will not designate any associated message as being suspicious. Meanwhile, however, if the spoofed thing 112 sends a spoofed message to the hub 104 by way of an unexpected or unverified path 506, then the hub 104 will be alerted to take corrective action, such as discarding any such messages, or saving the messages for further processing and analysis (perhaps in conjunction with raising an alarm to trigger such processing or analysis).

In another example, the second spoofed thing 502 may attempt to transmit a spoofed message to the hub 104 by way of a path 508 that is associated with an unexpected or incorrect location and/or path. In such cases, again, the hub 104 may discard any such messages as being received from an unexpected or incorrect location/path or may save such messages for further processing in an attempt to identify and ultimately stop the second spoofed thing 502.

In a final example scenario of FIG. 5, the spoofed thing 112 may transmit a spoofed message to the hub 104 by way of an expected location/path 510, while also successfully suppressing a corresponding, expected message from the network-connected thing 106. In such cases, at least with respect to the techniques and examples of FIG. 5, the spoofed thing 112 may be able to send a spoofed message that is not detected as such.

Thus, with respect to both FIGS. 4 and 5, it may observed that the protocol controller 102 matches transmission characteristics that are expected to be associated with a particular received message against actual transmission characteristics that have been detected with respect to each such message. In cases where the analyzed transmission characteristics for two or more received messages match, and a total number of such received messages exceeds an expected number, all such messages may be regarded as suspicious, and may be discarded and/or identified as requiring immediate or later analysis or processing. In scenarios in which messages arrive having actual transmission characteristics that do match expected transmission characteristics, such messages may again be discarded or saved for separate, subsequent analysis. In all such cases, potentially illicit or spoofed messages will be withdrawn from a data set that is actually utilized to perform whatever type of message analysis that was originally scheduled, so that the spoofed messages are not permitted to cause the types of data integrity disruptions and/or perpetrated frauds described above with respect to FIG. 1.

As also described with respect to both FIGS. 4 and 5, if a spoofed thing is successful in obtaining or guessing correct values for the expected transmission characteristics (e.g., expected time window, or expected location/route), and is also successful in suppressing actual, authentic messages expected from a particular network-connected thing, such as the network-connected thing 106, then either of the individual techniques of FIGS. 4 and 5 may experience difficulty in identifying potential spoofed messages. Nonetheless, it will be appreciated that it will be extremely difficult in most cases for a spoofed thing to obtain or guess either of the described transmission characteristics of FIGS. 4 and 5. Moreover, it will be even more difficult for the spoofed thing to obtain or guess expected transmission characteristics over time, since, as described, the protocol controller 102 may be configured to alter such transmission characteristics over time in order to reduce the chances that expected transmission characteristics will be obtained or guessed (e.g., may change a timing or duration of the time windows 402-406 of FIG. 4).

Still further, it will be apparent that the techniques of FIGS. 4 and 5 may be used in conjunction with one another in order to further reduce the chances that an operator of the spoofed thing 110 will be able to consistently guess or obtain combinations of expected transmission characteristics. For example, the message handler 114 of the protocol controller 102 may be configured to verify both the expected time window and the expected location/path of the network-connected thing 106. For example, in such cases, it may be possible to implement both techniques of FIGS. 4 and 5 in parallel with one another, or, in other implementations, it may be desirable to implement the two techniques in series or in other relationships to one another. For example, as described below with respect to FIG. 7, it may be desirable to execute the time window technique of FIG. 4 initially, and to initiate the location/route techniques of FIG. 5 only in circumstances in which it is determined to be possible or likely that the time window techniques of FIG. 4 have not been successful. Of course, in alternate implementations, the techniques of FIG. 5 may be utilized in the first instance, so that the time window techniques of FIG. 4 will be used only when the location/route techniques of FIG. 5 are not successful.

Figure 6:
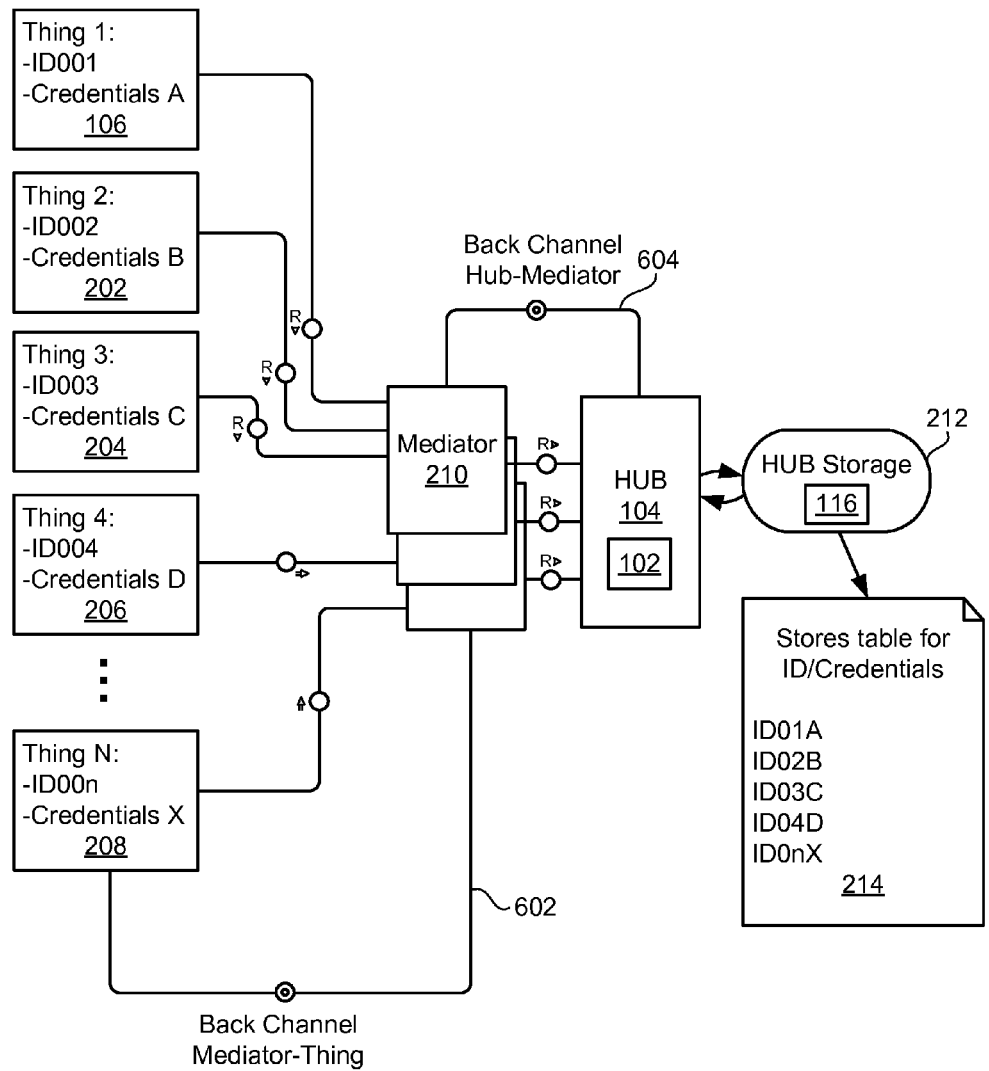
FIG. 6 is a block diagram illustrating an example implementation of the backchannel manager of FIG. 1.

FIG. 6 is a block diagram illustrating example implementations of the back channel manager 122 of FIG. 1. As will be appreciated from the above description, use of the back channel 124 of FIG. 1 represents an additional or alternative technique for identifying potential spoofed messages in the system of FIG. 6. That is, the back channel techniques of FIG. 6 may be utilized in conjunction with the time window techniques of FIG. 4 and/or the location/route techniques of FIG. 5.

In the example of FIG. 6, as shown, the back channel 124 may be implemented as a back channel 602 between a mediator and a specific thing (e.g., the network-connected thing 208). Additionally, or alternatively, the back channel 124 may be implemented in whole or in part using a back channel 604 between the hub 104 and a mediator, such as the mediator 210.

In practice, at random or predefined time intervals, and/or in response to an alarm being raised with respect to possible suspicious message activity (in conjunction with the techniques of FIGS. 4 and/or 5), the hub 104 may utilize the back channels 602, 604 to request a confirmation or verification of an authenticity of a suspicious received message. As also referenced above, in some scenarios, the hub 104 may simply request a response message from an expected network address and/or machine ID of the network-connected thing 106.

This approach will be feasible in many cases, except, e.g., may possibly not be successful when the operator of the spoofed thing 112 (not explicitly illustrated in the example of FIG. 6) is capable of receiving messages at the address of the network-connected thing from which confirmation is being requested). In such cases, the spoofed thing 112 could itself send the requested confirmation. In other example implementations, and depending upon native capabilities of the network-connected thing 106, two or even more communication channels may be available to serve as primary in one or more back channel links. For example, a primary communication channel may transmit HTTP traffic, while the back channel 602 may utilize SMS.

In obtaining verifications or confirmations of received messages, additional passwords, challenges, or other authentication techniques may be utilized in conjunction with the back channels 602, 604. For example, the back channel reporter 144 of the network-connected thing 106 may be provided with such authentication information to use in conjunction with responding to a back channel request from the hub 104.

Additionally, the back channel 602, 604 may be utilized in configuring other aspects of the spoofing protection protocol, such as parameters related to the time window techniques of FIG. 4 and/or the location/path techniques of FIG. 5. For example, the back channel 602, 604 may be utilized to modify a length, frequency, or number of time windows being used.

Figure 7:
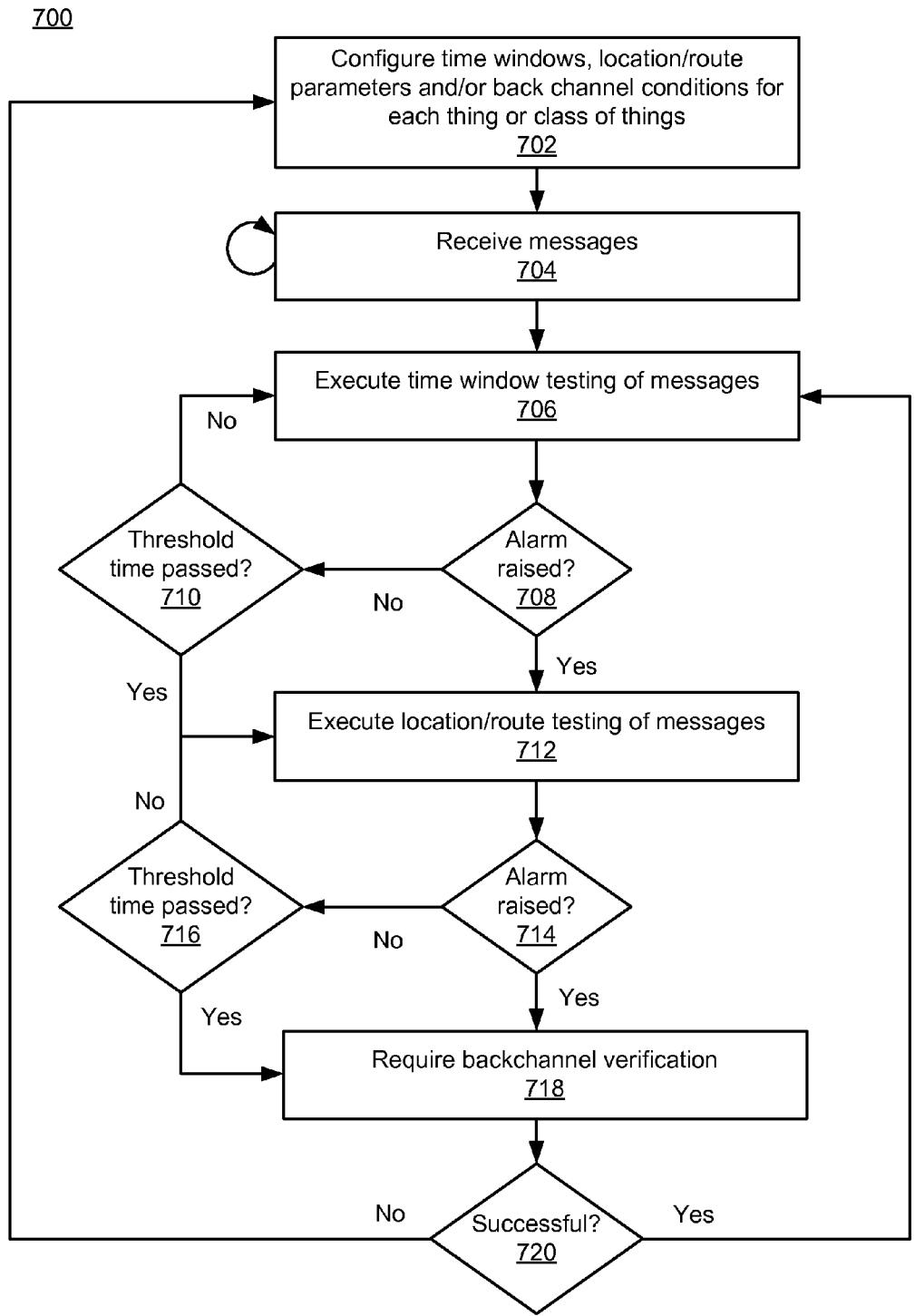
FIG. 7 is a flowchart illustrating more detailed example operations of the systems of FIGS. 1 and 2, using the techniques of FIGS. 4-6.

FIG. 7 is a flowchart 700 illustrating more detailed example operations of the systems of FIGS. 1 and 2. FIG. 7 illustrates specific example implementations in which specific combinations of the techniques of FIGS. 4-6 are used in conjunction with one another. However, of course, the example of FIG. 7 is non-limiting, and many additional or alternative implementations may be used which leverage the flexible and customizable aspects of the systems of FIGS. 1 and 2.

In the example of FIG. 7, time windows, locations/route parameters, and/or back channel conditions may be configured for each network-connected thing or class of network-connected things (702). For example, the protocol controller 102 may be accessed to populate the transmission characteristic repository 116 with expected values for the various transmission characteristics (and associated response characteristics) described herein and referenced with respect to the operation 702. As also referenced, such transmission characteristics may be specified with respect to individual ones of a network of network-connected things, or with respect to groups, classes, or types of such network-connected things.

Subsequently, as messages are received (704), time window testing of the received messages may be executed (706), as described above with respect to the message handler 114 and in conjunction with the example of FIG. 4. As described above, such testing may result in the possibility of an alarm being raised (708), such as when messages are received outside of an expected time window, or when more messages than expected are received within one or more of the time windows.

As long as no such alarm is raised, and as long as a threshold (or random) time limit has not passed (710), the time window testing of the messages may continue to be executed (706). However, if an alarm is raised (708), or if the threshold time passes (710), then the protocol controller 102 may determine that a justifiable suspicion of a possibility of spoofed messages having been received should be considered. Consequently, in the example of FIG. 7, location/route testing of messages may begin to be executed (712). Again, if an alarm is not raised with respect to the location/route testing of the messages (714), and a threshold time has not passed (716), the location/route based testing of the messages may continue to be executed (712).

However, if an alarm, such as an alarm reflecting an unexpected location or route, is received from a specific location/route, then, again, the protocol controller 102 may predict the possibility of illicit spoofed messages. Also, if a threshold or random time has passed without an alarm being raised (716), then a triggering of a requirement for back channel verification may occur (718). In such cases, the protocol controller 102 may utilize an appropriate back channel to communicate with a network-connected thing recognized as having sent a message in question, in order to attempt verification or confirmation of the authenticity of the message in question.

If such verification is successful (720), then the process may continue with the execution of time window testing of subsequently-received messages (706). Otherwise, if not successful (720), then one or more of the various transmission characteristic parameters (e.g., time windows, location/route, or back channel parameters) may be altered (702).

In a more specific example implementation of the example of FIG. 7, it may occur that the network-connected thing 106 is connected to the hub 104 and includes its own SIM card, and is capable of running software. The network-connected thing 106 may send messages in this example using an HTTPS connection to the hub 104, with messages containing a unique ID and associated credentials. In this example, as described above, an attacker operating the spoofed thing 110 may send the spoofed message 112 using a fake ID and/or credentials.

In the example, the following measures may be applied: a fixed time window, an expected location (e.g., a network-determined location using GSM positioning and/or a native GPS locator), and back channel communications via SMS (e.g., leveraging registration with an application exceeding at the network-connected thing). As may be appreciated, if all of the above measures are utilized, in conjunction with the techniques of FIG. 7, or similar techniques, then, in addition to relying on a unique ID and associated credentials, the attacker operating the spoofed thing 110 would also need to know or guess the time windows, conform with the expected location verification, and intercept messages sent via the back channel to the original network-connected thing. Moreover, even if the attacker were capable of meeting all of these requirements, the attacker could be further thwarted through the periodic or random altering of some or all of the parameters associated with implementations of the described techniques.

In another specific example implementation, the network-connected thing 106 may have a more limited feature set, and may be connected to a mediator as described above, where, in the example, the mediator may include a personal computer or other similarly-equipped device capable of connecting one or more network-connected things to the hub 104 via a wire or wireless connection. In such examples, an attacker may connect to the mediator and impersonate network-connected things local to the mediator, or anywhere in the overall system.

In this example as well, the measures of a fixed time window and expected network location (e.g., network path of messages being received) may be utilized. Further, a back channel may be provided by utilizing a server that allows the hub 104 to act as a client. In such a scenario, the back channel may be made very secure, e.g., through the use of strong authentication (e.g., digital certificates). The back channel may then be used to request an actual status of the network-connected thing, even with a very limited feature set of the network-connected thing. In this way, the thus-obtained status of the network-connected thing may be compared to a status thereof as reflected within the received, suspicious message.

In this scenario, the attacker operating the spoofed thing 110 would again need to know or guess the time window parameters being used, as well as an expected path of the message, and be able to spoof the path (network location) of the message. Further, the attacker would need to intercept messages from the back channel. As such, an attacker would be unable to spoof a network-connected thing other than one directly connected to the same mediator. If the attacker has access to the same mediator, the attacker would still need to be able to intercept message sent to the original network-connected thing, and would need to be able to suppress the messages from the original network-connected thing in order to avoid detection of the spoofing attempt.

Although the example of FIG. 7 illustrates a sequence in which time windows are used prior to location parameters, and backchannel techniques are used subsequently, many other techniques are possible. For example, time windows and location parameters may be used in parallel, or the location parameters may be used prior to the time window parameters.

Moreover, it may be appreciated that the techniques described herein are highly customizable, down to level of an individual network-connected thing. The techniques use native or highly-available features of such things, even when the things are relatively inexpensive and low in processing capabilities, memory, and/or native security features.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for implementing a spoofing protection protocol for verifying a message received over a network from a network-connected thing, in the presence of a spoofed message transmitted from a spoofed thing illicitly representing the network-connected thing, the system including instructions recorded on a non-transitory computer-readable storage medium, and executable by at least one processor, wherein the instructions, when executed by the at least one processor, cause the at least one processor to:
   control a transmission characteristic of the network-connected thing;
   store the controlled transmission characteristic within a transmission characteristic repository;
   receive a message identified as originating from the network-connected thing;
   execute a verification of a received transmission characteristic of the message against the controlled transmission characteristic previously stored with respect to the network-connected thing within the transmission characteristic repository, and
   determine whether the message originated from the network-connected thing, based on the verification.

2. The system of claim 1, wherein the instructions, when executed, are further configured to cause the at least one processor to execute the verification including determining that the message shares the controlled transmission characteristic with a second message addressed as having been received from the network-connected thing, and therefore exceeds an expected number of messages from the network-connected thing having the controlled transmission characteristic.

3. The system of claim 1, wherein the instructions, when executed, are further configured to cause the at least one processor to execute the verification including determining that the message does not possess the controlled transmission characteristic, and identifying the message as violating the spoofing protection protocol.

4. The system of claim 1, wherein the instructions, when executed, are further configured to cause the at least one processor to change the controlled transmission characteristic, based on the verification.

5. The system of claim 1, wherein the controlled transmission characteristic includes transmission within an expected time window.

6. The system of claim 1, wherein the controlled transmission characteristic includes a location parameter specifying transmission of the message in accordance therewith.

7. The system of claim 6, wherein the location parameter specifies a geophysical location or route of the network-connected thing.

8. The system of claim 6, wherein the location parameter specifies a network address of the network-connected thing.

9. The system of claim 1, wherein the controlled transmission characteristic includes transmission within an expected time window and a location parameter specifying transmission of the message in accordance therewith, and wherein the verification includes selecting one or both, based on a previous verification of a preceding message from the network-connected thing.

10. The system of claim 1, wherein the instructions, when executed, are further configured to cause the at least one processor to send a request to the network-connected thing using a backchannel to complete the verification.

11. A computer-implemented method for executing instructions stored on a non-transitory computer readable storage medium, the method comprising:
   directing a network-connected thing to transmit messages within an expected plurality of time windows;

directing the network-connected thing to transmit the messages with an expected location parameter of the network-connected thing;

receiving a message identified as originating from the network-connected thing and identified as potentially being a spoofed message transmitted from a spoofed thing illicitly representing the network-connected thing;

selecting one or both of the expected plurality of time windows and the expected location parameter; and executing a verification of the message as originating from the network-connected thing, based on the selecting.

12. The method of claim 11, wherein the executing the verification includes determining that the message shares an expected time window of the plurality of time windows with a second message addressed as having been received from the network-connected thing and therefore exceeds an expected number of messages from the network-connected thing within the expected time window.

13. The method of claim 11, wherein the executing the verification includes determining that the message is outside of an expected time window of the plurality of time windows, and thereafter treating the message as the potential spoofed message.

14. The method of claim 11, wherein the executing the verification includes determining that the message either does not have the expected location parameter or shares the expected location parameter with a second message addressed as having been received from the network-connected thing, and thereafter treating the message as the potential spoofed message.

15. The method of claim 11, comprising sending a backchannel message to the network-connected thing as part of the spoofing protection protocol and to verify an identity thereof.

16. A computer program product, the computer program product being tangibly embodied on a non-transitory computer-readable storage medium and comprising instructions that, when executed, are configured to cause at least one computing device to:

store a spoofing protection protocol specifying at least one transmission characteristic of at least one message to be sent by a network-connected thing;

direct the network-connected thing to execute message transmissions in accordance with the spoofing protection protocol, including using the at least one transmission characteristic;

receive, in accordance with the spoofing protection protocol, a message identified as originating from the network-connected thing and identified as potentially being a spoofed message transmitted from a spoofed thing illicitly representing the network-connected thing;

select, based on the message and in accordance with the spoofing protection protocol, the at least one transmission characteristic as including one or both of an expected plurality of time windows in which messages from the network-connected thing are expected to be received and an expected location parameter of the network-connected thing;

verify whether the at least one transmission characteristic complies with the spoofing protection protocol; and send, in a case where the transmission characteristic does not comply with the spoofing protection protocol, a backchannel message to the network-connected thing to verify an identify thereof.

17. The computer program product of claim 16, wherein the instructions, when executed, are further configured to select one or both of the expected plurality of time windows and the expected location parameter for use in verification of the message, based on a previous verification of a preceding message from the network-connected thing.

18. The computer program product of claim 16, wherein a second backchannel message is sent at an interval that is independent of receipt of the message.

19. The computer program product of claim 16, wherein the backchannel message alters one or more parameter values of the at least one transmission characteristic.

20. The computer program product of claim 16, wherein the instructions, when executed, are further configured to:

determine that the message does not possess the at least one transmission characteristic; and discard the message from use within the spoofing protection protocol.

* * * * *